Patented Mar. 29, 1938

2,112,313

UNITED STATES PATENT OFFICE 2,112,313

PROCESS FOR REDUCING ORGANIC ACIDITY IN MINERAL OILS

Wesley H. Sowers, Swarthmore, Pa., assignor to The Pure Oil Company, Chicago, Ill., a corporation of Ohio No Drawing. Application March 26, 1935, Serial No. 13,085

3 Claims. (Cl. 196—41)

This invention relates to a process for reducing organic acidity in mineral oils. The invention is more particularly concerned with reducing the naphthenic acid content of lubricating oil distillates.

In the preparation of neutrals from crude oil it is customary to subject the crude to distillation in order to first remove the gasoline, kerosene, and gas oil fractions therefrom. The distillation may be continued at a higher temperature with steam to form a wax distillate containing wax in pressable form. In more modern practice, the crude is subjected to non-cracking distillation under vacuum with or without steam and the vapors carefully fractionated to produce a pressable wax distillate. This distillate may then be filter pressed to remove wax and the resulting oil is known as pressed distillate. To reduce the organic acidity of the pressed oil it is subjected to treatment with sulfuric acid followed by neutralization with caustic soda and water washing. The distillate is then reduced by fire and steam and/or vacuum to the desired viscosity. The resulting product is again acid treated with sulfuric acid and finally contacted with clay to neutralize and clarify it.

The organic acidity present in the oil must be reduced to a very small amount since its presence causes the oil to emulsify in the presence of water with consequent loss in lubricating value. The organic acids are also corrosive to some extent. The common method in use for reducing organic acidity causes excessive losses in oil because of formation of sludge with sulfuric acid, and also formation of emulsions with the alkali treating agents.

One of the objects of my invention is to reduce the organic acidity of mineral oils and particularly lubricating oil distillates.

Another object of my invention is to reduce losses consequent upon reducing organic acidity of mineral oils.

A further object of my invention is to eliminate the acid treatment heretofore used in reducing organic acidity of mineral oils.

Still another object of my invention is to recover organic acids from mineral oils in a form in which they can be utilized commercially.

Other objects of my invention will be apparent from the following detailed disclosure.

In accordance with my invention, oil to be treated for the purpose of reducing the organic acidity thereof may be charged to an agitator and heated to a temperature of 150° to 212° F. but preferably to a temperature between 170° to 180° F. The temperature may be varied somewhat but is preferably kept below the boiling point of water. The oil may be agitated by air jets or by other inert gas such as nitrogen or carbon dioxide. While the oil is undergoing agitation an aqueous solution of caustic soda, preferably dilute, may be added slowly until sufficient caustic soda solution is present to neutralize from 60 to 90% of the organic acid content of the oil. Other alkalies may be used in place of caustic soda. The acid content of the oil may be determined prior to treatment and the quantity of caustic to be added may be readily calculated. The temperature of the oil is maintained during the entire treatment and the air blowing is continued for a sufficient period of time to insure complete reaction between the caustic soda and the acids present in the oil. Thirty minutes usually suffices for this step but the duration of the agitation may vary somewhat depending on the particular oil treated, the concentration of caustic used, and the effectiveness of the agitation. After the oil has been sufficiently agitated and contacted with the caustic, the air supply is shut off and the contents of the agitator allowed to remain quiescent for a period of time sufficient to cause a clean separation between the oil and the soaps formed as a result of the reaction between the acids present in the oil and the caustic soda. A clean separation will take place in a comparatively short time, usually in about ten minutes. Because of the fact that the soaps have entrained therein air or other gas used in the agitation, the soaps are lighter than the oil and float on the top thereof. The soaps may be completely and cleanly skimmed from the surface of the oil and will contain only an extremely small proportion of oil.

After the soaps have been completely skimmed, additional caustic solution is added in amount sufficient to neutralize the remaining organic acidity, and the oil and caustic again vigorously agitated with air. Any suitable agitating means may be employed in the second stage. The second stage treatment usually requires a longer period of agitation than the first stage in order to reduce the acid content to the required degree. The duration can be determined by taking samples of the oil and determining quantitatively the acid content thereof. When the acidity has been reduced to the required degree, agitation is stopped and the contents of the agitator permitted to settle. The soaps and any free caustic which remain after the second stage treatment settle to the bottom of the agitator and in approximately thirty minutes the separation will be complete. The spent caustic and soaps may be withdrawn from the bottom of the agitator with only an extremely small amount of oil mixed therewith. Following the separation of the spent caustic and soap from the second stage, the oil is washed with hot water to free it of any remaining traces of soap and/or caustic. The oil if properly treated has no tendency to emulsify with the water during the washing stage.

In the first stage of neutralization it is desirable to neutralize as high a proportion of the organic acidity as possible without having any excess of caustic soda present. The reason for avoiding excess caustic is twofold: first, any excess of caustic soda over that necessary to neutralize organic acidity will cause the oil to emulsify; second, in the presence of excess caustic the resulting soaps cannot be separated from the oil in a form in which they are suitable for commercial application. With a little practice the initial step of the neutralization can be carried out in such a manner as to obtain the maximum yield of soaps without causing any emulsification of the oil. These soaps, because of the entrainment of air, will float on the top of the oil and do not emulsify with the oil since there is no excess caustic present.

After the oil is thoroughly washed with hot water it may be reduced to any desired viscosity with fire and steam and/or vacuum. The residuum as well as any distillate recovered may then be treated with sulfuric acid after which the sludge is separated and the oil filtered through adsorbent clay to neutralize and clarify it.

As an example illustrating my process, pressed oil prepared from Van Zandt crude and having an acid number between .4 and .5 as determined by the A. S. T. M. Method D 188–27 T, was charged to an agitator and heated to a temperature of from 170° to 180° F. This temperature was maintained during the entire treating and washing operation. Air was turned on slowly and the oil mildly agitated while an aqueous caustic soda solution containing 2% of sodium hydroxide was slowly added until sufficient caustic was present to neutralize approximately 90% of the organic acid content of the oil. This required about 5% by volume of caustic. The air blowing was continued for thirty minutes after which the oil was allowed to remain quiescent for about ten minutes. The soaps were skimmed from the top of the oil and the oil again agitated with approximately 5% by volume of 2% caustic soda. The agitation was continued for one hour with air and the oil afterward permitted to settle for thirty minutes. The free caustic and soap was withdrawn from the bottom of the agitator and the oil washed with hot water. The oil was permitted to settle for a short period before being charged to the still where it was reduced to the desired viscosity. The reduced oil was treated with sulfuric acid and filtered through clay. The resulting oil showed no tendency to emulsify and the loss incurred by the treatment was approximately 2%.

The soaps skimmed from the surface of the oil after the first stage of the treatment contained a very small amount of free caustic and oil. These soaps are eminently suited for compounding in grease manufacture or in the preparation of emulsifying agents for use in forming oil emulsions.

It will be seen therefore that I have not only found a novel method for reducing organic acidity of mineral oils without the necessity of an acid treatment prior to alkali treatment but I have also discovered a method of converting the acids present in the oil into valuable soaps which can be separated in a high state of purity suitable for commercial use without further refining.

Although the specific example herein disclosed relates to the treatment of Van Zandt pressed oil, it will be understood that the invention is applicable to the treatment of lubricating oils in general, having a high organic acid content.

What I claim is:

1. The method of reducing organic acidity in petroleum oils which comprises determining the amount of acid present in the oil, adding to the oil sufficient aqueous alkali solution to neutralize the major portion of the soap forming organic acids but insufficient to completely neutralize the oil, agitating the oil and alkali by means of a gas for a period of time sufficient to cause substantially complete reaction of the alkali with said acid, permitting the oil and reaction products to stratify, removing reaction products from the surface of the oil, adding sufficient aqueous alkali to the separated oil to neutralize the remaining acids therein, agitating the oil and alkali for a sufficient period of time to reduce the organic acid content to the desired extent, permitting the reaction products and spent caustic to form a layer beneath the oil, and separating the oil therefrom.

2. The process of preparing lubricating oil from pressed petroleum oil which consists in agitating said oil at elevated temperatures by means of air in the presence of sufficient caustic soda to neutralize from 60 to 90% of the organic acid content, continuing the agitation until the caustic is substantially exhausted, permitting the oil and reaction products to stratify, separating the reaction products from the surface of the oil, again agitating the oil with sufficient caustic to neutralize the remaining acid content, permitting the oil to settle and separating the reaction products and spent caustic from the bottom of the agitator, washing the oil with hot water, distilling the oil to desired viscosity, treating the reduced oil with acid, separating the oil and sludge, and filtering the oil through adsorbent clay.

3. The method of removing organic acidity from petroleum lubricating oil fractions which comprises mixing with the oil prior to acid treatment, an aqueous solution of alkali in quantities sufficient to neutralize the major portion of the soap forming organic acids but insufficient to completely neutralize said acids, agitating the mixture to bring about intimate contact between the oil and alkali and to cause the alkali to combine with said acids, separating the reaction products from the oil and again treating the oil with sufficient aqueous alkali to complete the neutralization of the organic acids.

4. Method according to claim 3 in which the mixture of oil and alkali is agitated by means of a gaseous medium.

5. Method in accordance with claim 3 in which the quantity of alkali used is sufficient to neutralize from 60–90% of the organic acids present in the oil.

6. The method of removing organic acidity from petroleum lubricating oil fractions which comprises mixing with the oil prior to acid treatment, aqueous alkali solution in amount sufficient to neutralize approximately 60–90% of the soap forming organic acid present in the oil, heating the mixture to a temperature of approximately 170°–180° F. and agitating the mixture by means of an inert non-condensable gas, separating the oil from the reaction products, again agitating the separated oil with sufficient aqueous alkali solution to neutralize the remaining acids in the oil, and separating the oil from the aqueous solution and reaction products.

7. In the method of reducing organic acidity in petroleum oils, the steps which comprise treating the oil at a temperature of approximately 170°–180° F. with a dilute aqueous solution of caustic soda in amounts to react with approximately 60–90% of the soap forming organic acid content, agitating the oil and caustic soda with air for a sufficient period of time to cause substantially all the caustic soda to react with said acid content, permitting the oil and reaction products to stratify whereby the reaction products rise to the surface of the oil, skimming the reaction products from the surface of the oil, again treating the oil with sufficient caustic soda solution to neutralize the remaining acid content, and agitating the oil and caustic soda with air for a sufficient period of time to reduce the acidity to the desired extent.

8. The method of reducing organic acidity in petroleum oils which comprises adding to the oil sufficient aqueous alkali solution to neutralize the major portion of the soap forming organic acids but insufficient to completely neutralize the total soap forming acids, agitating the oil and alkali with an incondensable gas for a period of time sufficient to cause substantially complete reaction of the alkali with said acids, causing the oil and reaction products to stratify, separating the reaction products from the oil, and thereafter neutralizing the remaining acidity of the oil in a second step.

WESLEY H. BOWERS.